(12) United States Patent
Garombo

(10) Patent No.: US 10,138,834 B2
(45) Date of Patent: Nov. 27, 2018

(54) SYSTEM AND METHOD FOR ESTIMATING THE QUANTITY OF PARTICULATE ACCUMULATED IN THE PARTICULATE FILTER OF A DIESEL ENGINE

(71) Applicant: Fiat Group Automobiles S.p.A., Turin (IT)

(72) Inventor: Danilo Garombo, Turin (IT)

(73) Assignee: Fiat Group Automobiles S.p.A., Turin (IT)

( * ) Notice: Subject to any disclaimer, the term of this patent is extended or adjusted under 35 U.S.C. 154(b) by 120 days.

(21) Appl. No.: 14/729,338

(22) Filed: Jun. 3, 2015

(65) Prior Publication Data

US 2015/0369154 A1 Dec. 24, 2015

(30) Foreign Application Priority Data

Jun. 18, 2014 (IT) .............................. TO2014A0481

(51) Int. Cl.
  *F02D 41/14* (2006.01)
  *F02D 41/02* (2006.01)
  *F01N 9/00* (2006.01)

(52) U.S. Cl.
  CPC ......... *F02D 41/1446* (2013.01); *F01N 9/002* (2013.01); *F01N 9/005* (2013.01);
  (Continued)

(58) Field of Classification Search
  CPC .......... F01N 9/002; F01N 9/005; F01N 9/007; F01N 2550/04; F01N 2900/0418;
  (Continued)

(56) References Cited

U.S. PATENT DOCUMENTS

2005/0166582 A1    8/2005  Gotou
2006/0096280 A1*   5/2006  Zhan ....................... F01N 9/002
                                                             60/297
(Continued)

FOREIGN PATENT DOCUMENTS

DE    102012022153        5/2014
FR         2887291       12/2006
JP      2005307828 A  * 11/2005

OTHER PUBLICATIONS

Search Report for Italian Application No. TO2014 A 000481 dated Feb. 9, 2015, 2 pages.

*Primary Examiner* — Phutthiwat Wongwian
*Assistant Examiner* — Matthew T Largi
(74) *Attorney, Agent, or Firm* — RMCK Law Group PLC

(57) ABSTRACT

A diesel engine system comprises a particulate filter interposed in an exhaust line and a plurality of fuel injectors associated with an engine. When a quantity of particulate accumulated within said filter is estimated to be greater than a threshold, a control mode of the injectors is activated causing an automatic regeneration of the filter, by increasing a temperature of exhaust gases fed to the filter sufficient for burning the particulate within the filter. A statistical model is applied which estimates the quantity of particulate accumulated in the filter per time unit The estimation of the particulate accumulated in the filter is corrected after each regeneration of the filter, on a basis of a comparison between the real variation of said temperature during the regeneration as detected by a sensor and a stored reference variation of said temperature previously detected empirically during a regeneration with the filter being empty.

8 Claims, 5 Drawing Sheets

(52) U.S. Cl.
CPC ........... *F01N 9/007* (2013.01); *F02D 41/029*
(2013.01); *F02D 41/0245* (2013.01); *F01N
2550/04* (2013.01); *F01N 2900/0418*
(2013.01); *F01N 2900/0601* (2013.01); *F01N
2900/1602* (2013.01); *F02D 41/1466*
(2013.01); *F02D 2200/0802* (2013.01); *F02D
2200/0812* (2013.01); *Y02T 10/26* (2013.01);
*Y02T 10/47* (2013.01)

(58) Field of Classification Search
CPC ..... F01N 2900/0601; F01N 2900/1602; F02D
41/0245; F02D 41/029; F02D 41/1446;
F02D 2200/0802; F02D 2200/0812; F02D
41/1466
See application file for complete search history.

(56) References Cited

U.S. PATENT DOCUMENTS

| | | | | |
|---|---|---|---|---|
| 2009/0320452 | A1* | 12/2009 | Gioannini | F01N 3/023 60/277 |
| 2009/0320880 | A1* | 12/2009 | Hakansson | B01D 41/04 134/18 |
| 2011/0209460 | A1* | 9/2011 | He | F01N 9/002 60/274 |
| 2013/0152551 | A1* | 6/2013 | Kotnish | F02D 41/1446 60/274 |
| 2015/0275800 | A1* | 10/2015 | Stenlaas | B60W 10/00 123/676 |

* cited by examiner

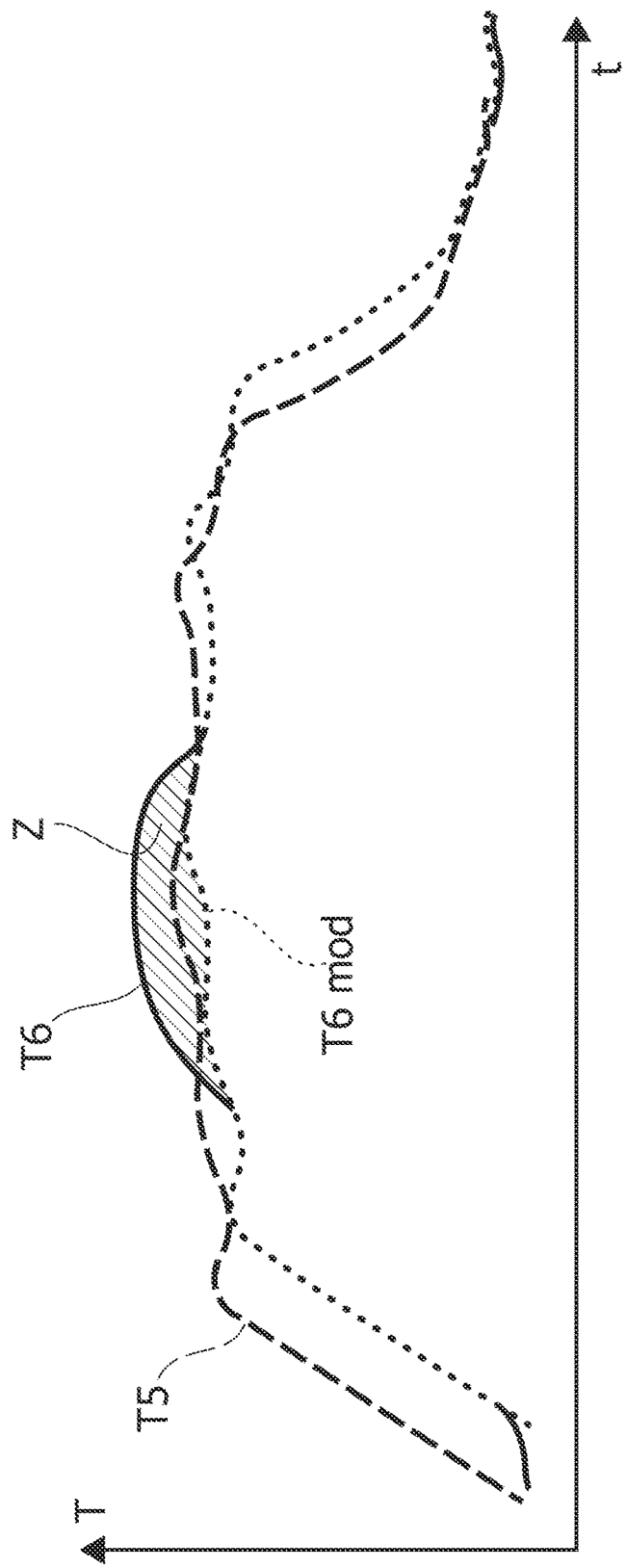

SYSTEM AND METHOD FOR ESTIMATING THE QUANTITY OF PARTICULATE ACCUMULATED IN THE PARTICULATE FILTER OF A DIESEL ENGINE

CROSS REFERENCE TO RELATED APPLICATIONS

This application claims priority to Italian Patent Application No. TO 2014 A 000481 filed on Jun. 18, 2014, the entire disclosure of which is incorporated herein by reference.

FIELD OF THE INVENTION

The present invention relates to diesel engines and refers in particular to a system and a method for estimating the quantity of particulate present in the particulate filter provided along the exhaust line of a diesel engine.

PRIOR ART

The reduction of particulate emissions at the exhaust of a diesel engine constitutes a key problem for satisfying present and future regulations relating to noxious emissions. In order to observe the limits posed on particulate emissions it is necessary to make use of systems for treatment of the exhaust gases, such as in particular a particulate filter or trap, which acts as a mechanical barrier adapted to prevent the passage of particulate. The above mentioned trap is integrated in the engine exhaust line and is able to hold therewithin the particulate generated during the combustion process, with an efficiency close to 100%. However, the accumulation of particulate on the filtering surface causes the pressure at the engine exhaust to increase, which determines a decrease in efficiency of the engine. Therefore, a regeneration of the trap by means of the combustion (lighting off) of the particulate accumulated inside the trap becomes periodically necessary. To this end, the electronic unit controlling the fuel injectors associated with the cylinders of the engine is programmed for activating—when the quantity of particulate accumulated within the filter is estimated to be greater than a threshold value—a control mode of the injectors which determines an automatic regeneration of the filter, by means of an increase of the temperature of the exhaust gases fed to the filter which is sufficient to burn the particulate within the filter. This temperature increase is obtained for example by controlling fuel multiple injections (in a number greater than five) within the same engine cycle. This is possible due to the extreme flexibility of modern fuel injection systems of the so called "common-rail" type.

FIG. 1 of the annexed drawings diagrammatically shows the injection control system and the exhaust system of a modern diesel engine. In this figure, reference numeral 1 designates the engine, having a plurality of cylinders each provided with a fuel electromagnetic injector 2 controlled by an electronic control unit E. Reference numeral 4 designates the air intake duct, in which there are interposed a flowmeter 5, a throttle valve 6, an exhaust gas recirculation valve 7 (EGR valve) and a surcharging compressor 8. Reference numeral 9 generally designates the engine exhaust line in which there are interposed a turbine 10 which is mechanically connected to the surcharging compressor 8, a pre-catalyst section 11, a catalytic converter 12 and the particulate filter 13. Reference numeral 14 designates the line for recirculation of the exhaust gases from the engine exit to the EGR valve 7. A sensor 15 detects the difference in pressure between areas upstream and downstream of the system for treatment of the exhaust gases which is constituted by the group of the catalytic converter and the particulate filter. The electronic control unit E receives signals from this sensor 15, from a temperature sensor T5 associated with the device for treatment of the exhaust gases and from the flowmeter 5, and sends control signals to the throttle valve 6, to the EGR valve 7 and to injectors 2.

The electronic control unit is able to activate an automatic generation mode of the filter, by controlling fuel multiple injections at each engine cycle, so as to temporarily bring the temperature of the exhaust gases fed to filter 13 up to a value not lower that 600° C., which causes burning (lighting off) of the particulate.

Technical Problem

According to the prior art, the quantity of particulate present within the filter is estimated by the electronic control unit with the use of a statistical model. For each condition of use of the engine and the vehicle, the control unit estimates a value of accumulation of particulate, expressed in grams/hour (g/h) of particulate within the filter ("soot-loading"), which is based on average statistical detections.

The drawback of this known solution is obviously that it may give rise to an estimation which is relatively far from the real value. The particulate emission depends indeed upon many different factors, such as the time position of the injections, the percentage of recirculation of the exhaust gases (EGR), the type of injectors. The set-up operations of an engine must be carried out with values of the various relevant parameters corresponding to average values within the respective variation ranges, or exactly corresponding to design specifications. However, due to the tolerances in manufacturing of the different components, the various parameters may vary widely, according to a Gaussian distribution, between maximum and minimum values, for each component.

In a "worst-case", an engine may have all its injectors which are out of calibration, injecting a quantity of fuel greater than what is foreseen by the electronic control unit, so that a greater quantity of smoke will be formed at the exhaust with respect to an engine having "ideal" injectors, able to inject a quantity of fuel corresponding to the design value. An overlapping of the effects of all those components which deviate from the ideal condition may result in an increase of smoke at the engine exhaust, even when each component remains anyhow below the maximum variation admitted by the manufacturing tolerances.

The statistical model used in known systems operates according to an open-loop and therefore is not able to consider the variations of the components and the failures which may occur during the vehicle life. For practical purposes, the statistical model considers an identical "city" mission profile for example for a number n of motor-vehicles which are being used according to a "city" cycle, taking for granted that in this condition soot-loading in g/h has a single predetermined value for all the motor-vehicles, independently from the specific characteristics of each vehicle.

OBJECT OF THE INVENTION

The object of the present invention is that of providing a diesel engine having a control system for the regeneration of the particulate filter based on a more precise estimation of the particulate accumulated within the filter, which enables to overcome the above discussed drawbacks. A further object of the invention is that of achieving the above mentioned purpose with simple and inexpensive means.

SUMMARY OF THE INVENTION

In view of achieving the above indicated objects, the invention provides a diesel engine system for a motor-vehicle, comprising a particulate filter interposed in the exhaust line of the engine and an electronic control unit controlling fuel injectors which are associated with the cylinders of the engine, said electronic control unit being programmed for activating—when an estimated amount of particulate accumulated in said filter exceeds a threshold value—a control mode of the injectors in which a regeneration of the filter is obtained through an increase of the temperature of the exhaust gases fed to the filter which is sufficient to burn the particulate within the filter, wherein the electronic control unit is configured for applying a statistical model which estimates the amount per time unit of particulate accumulated within the filter (soot-loading), on the basis of the operating conditions of the engine and of the vehicle, characterized in that said system comprises a sensor of the temperature of the exhaust gases at the exit from the particulate filter and in that said electronic control unit is configured to correct said estimated value of the accumulation of particulate (soot-loading) after each filter regeneration, on the basis of a comparison between the actual variation of said temperature detected by said sensor during regeneration in the real case and a reference variation of said temperature stored in said electronic control unit and previously detected empirically during a regeneration with said filter being empty, i.e. without particulate accumulated therewithin.

The invention also provides a method for controlling a diesel engine systems of the type comprising a particulate filter interposed in the exhaust line of the engine and a plurality of fuel injectors associated with the cylinders of the engine, in which, when an estimated amount of particulate accumulated within said filter exceeds a threshold value, a control mode of the injectors is activated providing a regeneration of the filter through an increase of the temperature of the exhaust gases fed to the filter which is sufficient to burn the particulate within the filter, in which a statistical model is applied which estimates the amount of particulate per time unit accumulated within the filter (soot-loading) on the basis of the operating conditions of the engine and of the vehicle, said method being characterized in that said system comprises a sensor of the temperature of the exhaust gases at the exit from the particulate filter and in that said estimated value of the accumulation of particulate within the filter (soot-loading) is corrected after each filter regeneration, on the basis of a comparison between the actual variation of said temperature detected by said sensor during the filter regeneration in the real case and a stored reference variation of said temperature which is previously detected empirically during a filter regeneration with said filter being empty, i.e. without particulate accumulated therewithin.

DESCRIPTION OF ONE EMBODIMENT

Further features and advantages of the invention will become apparent from the following description, with reference to the annexed drawings, given purely by way of non-limiting example, in which:

FIG. 1, already discussed in the foregoing, diagrammatically shows a diesel engine of the type to which the present invention is applied, FIG. 2 shows the same system as shown in FIG. 1, with the addition of a sensor T6 for sensing the temperature of the exhaust gases at the exit from the particulate filter, according to what is provided in the present invention, FIG. 3 is a block diagram which shows the operations for which the electronic control unit is programmed in the case of the present invention, and FIGS. 4, 5 are diagrams showing the variations of the temperature of the exhaust gases during the regeneration of the filter, in the case of "empty filter", i.e. without particulate accumulated therein, and in a real case.

Both in the case of the known system of FIG. 1 and in the case of the system according to the invention which is shown in FIG. 2, the control unit E is programmed for activating an automatic regeneration of the particulate filter when the quantity of particulate accumulated within the filter exceeds a predetermined level. In the case of the prior art, this quantity is estimated, as already indicated in the foregoing, exclusively with the use of a statistical model of the process of accumulation of particulate within the filter, which enables the quantity of this accumulation to be determined on the basis of the condition of use of the vehicle (corresponding to the so-called "mission profile" of the vehicle). As also already indicated, the mode of operating of the known systems does not provide a high precision of the estimation of the particulate accumulation (soot-loading) in the filter.

The system according to the invention makes use of the statistical model which is also used in the known systems, but corrects the information obtained with this statistical model on the basis of an analysis of the heat generation determined by the regeneration of the filter.

In FIG. 2, all the components exactly correspond to those already described with reference to FIG. 1, except for the addition of the temperature sensor T6 at the exit of filter 13. Sensor T6 per se has already been proposed in relation to diesel engines in order to satisfy the European regulation EU6. In these engines, this sensor has been introduced in order to optimize the duration of the regeneration of the particulate filter. However, the present invention provides for a new use of the information given by this component.

FIG. 3 of the annexed drawings is a block diagram which shows the operations for which the electronic control unit is programmed in the case of the system of the present invention.

In this figure, block S.M. ("Statistical Model") is intended to refer to the operations for estimating the particulate accumulation, for which the electronic control unit E is programmed, similarly to the prior art. In this block the control unit calculates the accumulation in terms of grams/hour (soot-loading) of particulate accumulated within filter 13, on the basis of an input information M.P. relating to the "Mission Profile" of the vehicle (such as "city-cycle", "out-of-town-cycle", "mix-cycle"). For each "Mission Profile", the control unit is configured for performing a predetermined calculation model, depending upon the operative conditions of the engine, which can be identified by one or more parameters.

Block S.M., outputs an information S.L. on soot-loading which is that normally adapted in the known systems.

In the case of the invention, the information S.L. is sent to a block C where it is corrected on the basis of a signal Δ which is sent by a block E.R.C. The block E.R.C. determines the correction signal Δ on the basis of an analysis of the heat generation deriving from each regeneration of the particulate filter 13.

This is done, according to what is described more in detail in the following, by comparing the variation of the temperature T6 during the real regeneration of the particulate filter and a stored variation of said temperature T6 which has been previously detected empirically during a regeneration with the filter empty, i.e. without particulate accumulated therein.

As shown in FIG. 3, block E.R.C. receives a signal T6 representing the temperature detected by sensor T6 during a real regeneration of filter 13.

Block E.R.C. receives also a signal from a block "T6mod" where there is stored the variation—previously empirically detected—of temperature T6 during a regeneration (used as a reference standard) with a totally "empty" filter 13 i.e. without particulate accumulated therein. In the block T6mod also different models of this reference standard variation can be stored, depending upon the various mission profiles (for this reason block T6mod can receive also signal M.P.).

Block E.R.C. calculates the correction signal Δ on the basis of the difference between signals T6 and T6mod, in the way illustrated in the following.

FIG. 5 shows instead the variations of the temperatures T5 and T6 detected by sensors T5 and T6 during a real regeneration, with filter 13 containing some particulate. In the diagram there is also indicated the reference variation T6mod of FIG. 4.

Figure 1:
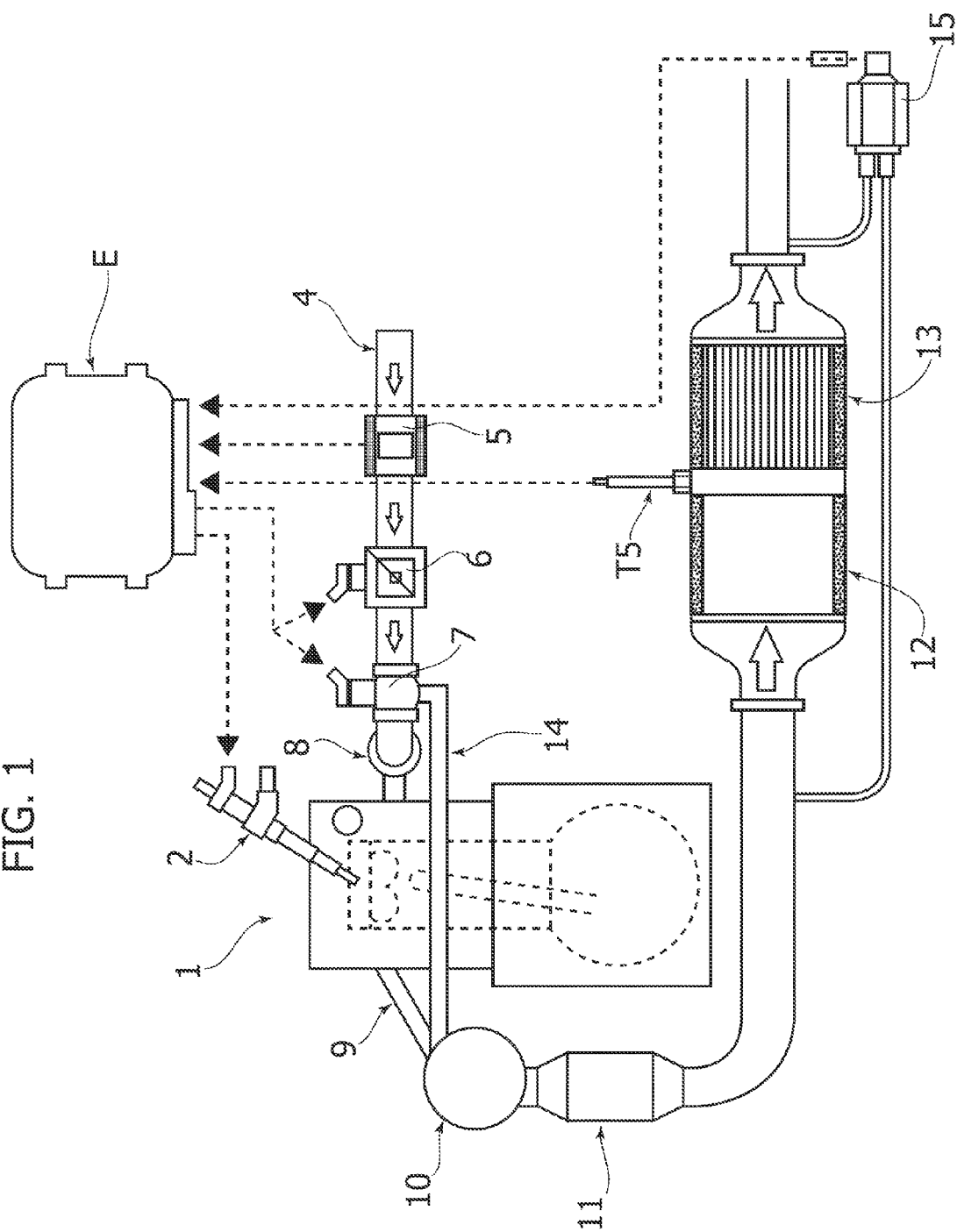
Figure 2:
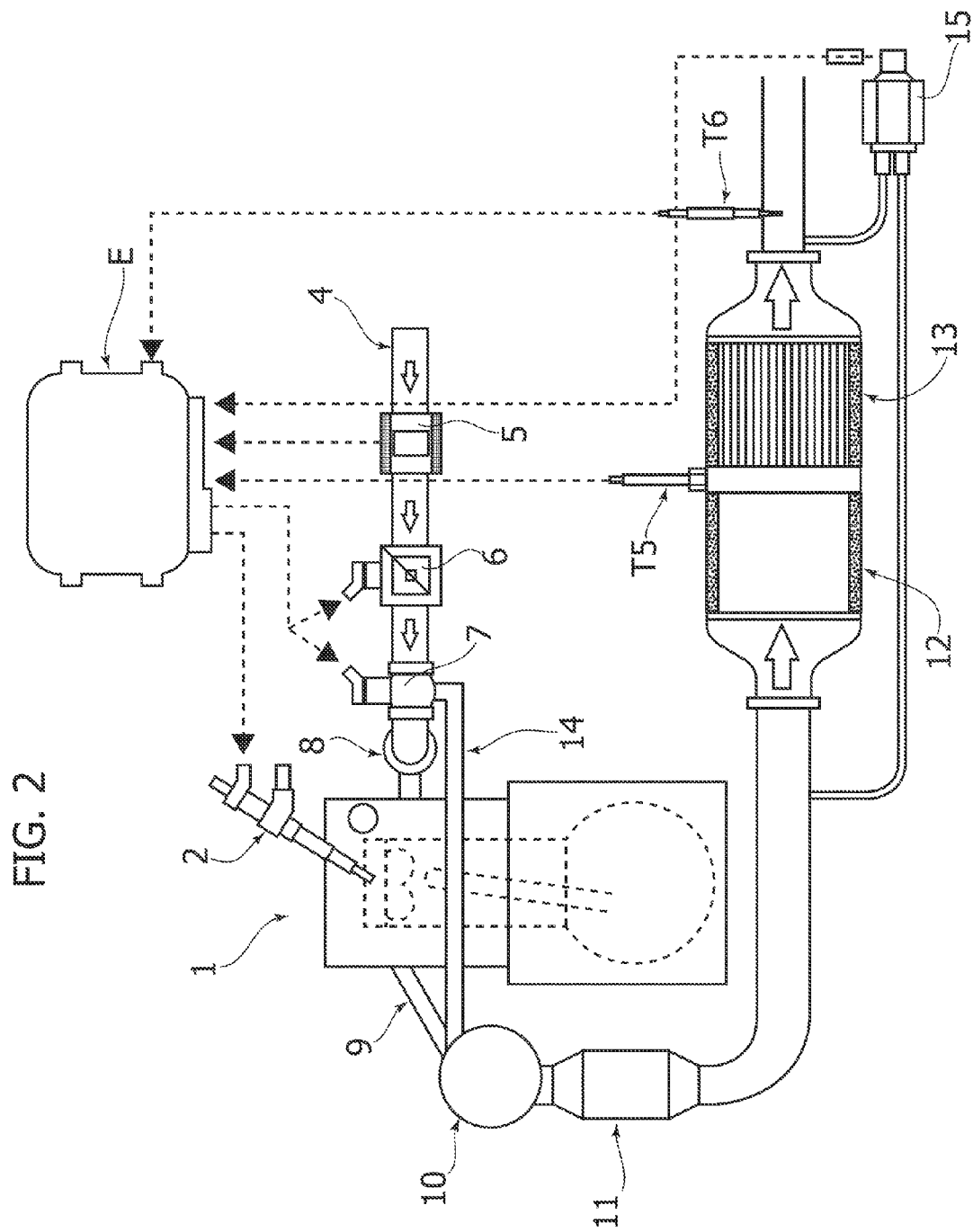
Figure 3:
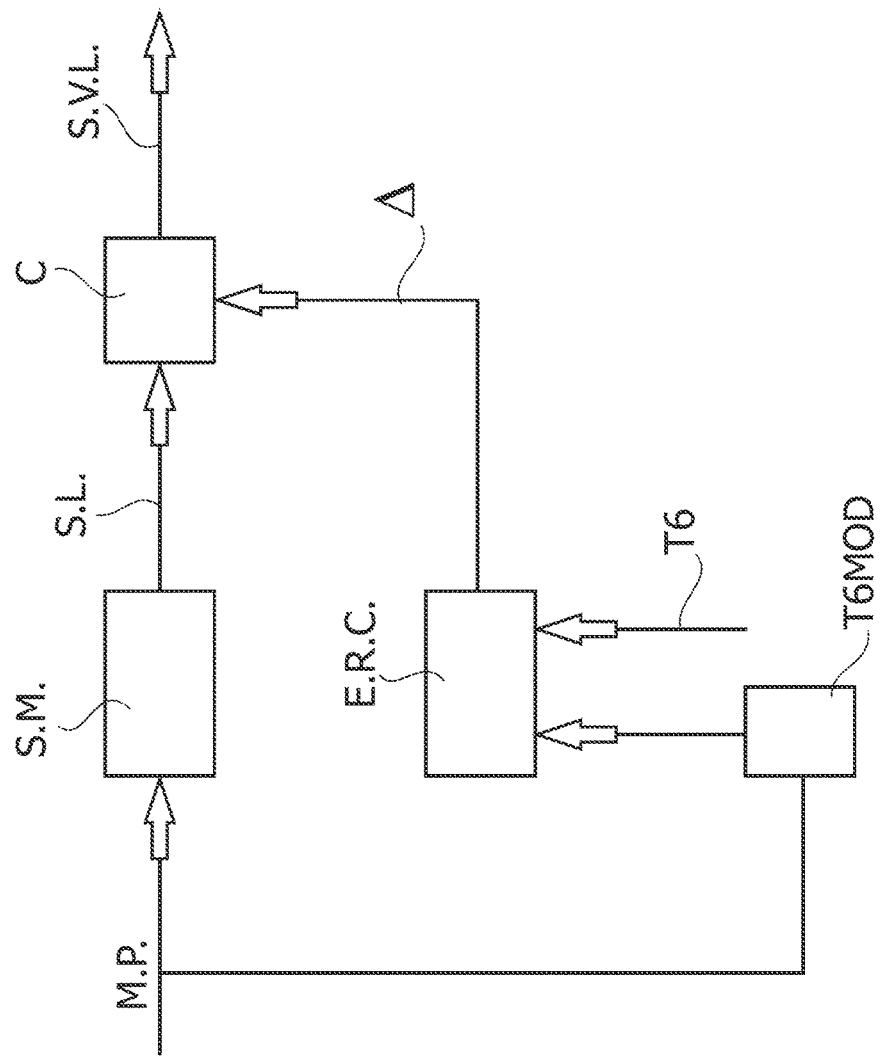
Figure 4:
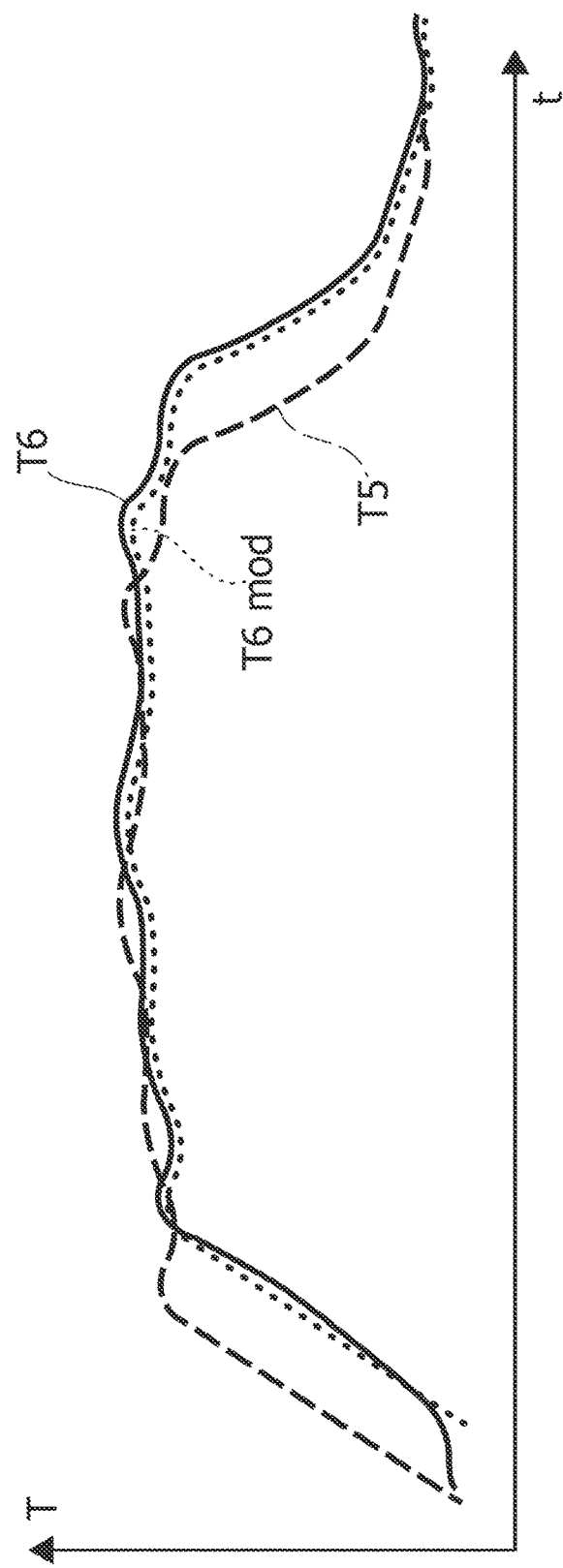
FIG. 4 shows the variation of temperatures T5 and T6 detected by sensors T5 and T6 during the reference standard regeneration, with filter 13 completely empty, i.e. without particulate accumulated therein. This figure also shows a variation T6mod, which obviously is coincident in this case with variation T6.

Block E.R.C. of FIG. 3 considers the heat generation due to the regeneration by conducting a comparison between signals T6 and T6mod of FIG. 5.

Preferably, according to the invention, not only a difference in temperatures is calculated, but also the area Z is calculated in the diagram temperature vs. time of FIG. 5 between signals T6 and T6mod, so as to obtain an information on the energy released during the regeneration by the mass of particulate which is really present within the filter.

Again in the case of the present embodiment, area Z is calculated for each mission profile, in the condition in which the quantity of particulate within filter 13 has reached the maximum value for which the automatic regeneration is triggered (this maximum value being different for each mission profile).

Due to the above mentioned features, the system according to the invention is able to perform an estimation of soot-loading which is substantially more precise with respect to the known systems, which enables the filter regeneration to be activated when there is a real need thereof, with a resulting reduction in the fuel consumption and a lower frequency of engine oil replacements. A lower number of fuel additional injections (for the purpose of regenerating the filter) provides in fact the advantage, apart from fuel saving, of a decrease of the quantity of fuel which is able to pass beyond the elastic rings of the engine pistons so as to enter in contact with the engine oil, thus causing a decrease in quality thereof.

Naturally, while the principle of the invention remains the same, the details of construction and the embodiments may widely vary with respect to what has been described and illustrated purely by way of example, without departing from the scope of the present invention as defined in the following claims.

What is claimed is:

1. A diesel engine system for a motor vehicle, comprising: a particulate filter interposed in an exhaust line of an engine, and an electronic control unit controlling fuel injectors which are associated with cylinders of the engine, said electronic control unit being programmed for activating, when an estimated amount of particulate accumulated in said particulate filter exceeds a threshold value, a control mode of the injectors in which a regeneration of the particulate filter is obtained through an increase of a temperature of exhaust gases fed to the particulate filter which is sufficient to burn the particulate within the particulate filter, wherein the electronic control unit is configured for applying a statistical model, which estimates an amount per time unit of particulate accumulated within the particulate filter, on the basis of operating conditions of the engine and of the vehicle, and wherein said system comprises a sensor configured to detect an exit temperature of the exhaust gases at an exit from the particulate filter and in that said electronic control unit is configured to correct said estimated amount of the accumulation of particulate after each particulate filter regeneration, on a basis of a comparison between an actual variation of said exit temperature detected by said sensor during regeneration and a reference variation of an exit temperature stored in said electronic control unit and previously detected empirically during a regeneration with said particulate filter being empty such that the particulate filter is without particulate accumulated therewithin, wherein said correction of said estimated amount of the accumulation of particulate after each particulate filter regeneration is based on a direct comparison of said exit temperature detected and said exit temperature stored.

2. The system according to claim 1, wherein said electronic control unit is configured to calculate an area in a temperature-versus-time diagram between signals corresponding to said actual variation of temperature and said reference variation of temperature, so as to obtain information on energy released during regeneration of a mass of particulate actually present within the particulate filter.

3. The system according to claim 2, wherein said area is determined for a series of different operating conditions of the engine and of the vehicle.

4. The system according to claim 3, wherein said area is calculated, for each operating condition of the engine and of the vehicle, in a condition in which the amount of particulate in the particulate filter has reached a maximum value which triggers the particulate filter regeneration.

5. A method for controlling a diesel engine system of the type comprising a particulate filter interposed in an exhaust line of an engine, and a plurality of fuel injectors associated with cylinders of the engine, the method comprising:

when an estimated amount of particulate accumulated within said particulate filter exceeds a threshold value, a control mode of the injectors is activated providing a regeneration of the particulate filter through an increase of a temperature of the exhaust gases fed to the particulate filter which is sufficient to burn the particulate within the particulate filter, applying a statistical model which estimates the amount of particulate per time unit accumulated within the particulate filter on a basis of operating conditions of the engine and of the vehicle, and wherein said system comprises a sensor configured to detect an exit temperature of the exhaust gases at an exit from the particulate filter and in that said estimated amount of the accumulation of particulate within the particulate filter is corrected after each particulate filter regeneration, on a basis of a comparison between an actual variation of said exit temperature detected by said sensor during the particulate filter regeneration and a stored reference variation of an exit temperature which is previously detected empirically during a particulate filter regeneration with said filter being empty such that the particulate filter is without particulate accumulated therewithin, wherein said correction of said estimated amount of the accumulation of particulate after each particulate filter regeneration is based on a direct comparison of said exit temperature detected and said exit temperature stored.

6. The method according to claim 5, further comprising calculating an area in a temperature-versus-time diagram between signals corresponding to said actual variation of temperature and to said reference variation of temperature, so as to obtain information on energy released during the regeneration of a mass of particulate actually present within the particulate filter.

7. The method according to claim 6, wherein said area is determined for a series of different operating conditions of the engine and of the vehicle.

8. The method according to claim 7, wherein said area is calculated, for each operating condition of the engine and of the vehicle, in the condition in which the amount of particulate within the particulate filter has reached a maximum value which triggers the particulate filter regeneration.

* * * * *